United States Patent
Chui et al.

(10) Patent No.: US 8,129,969 B1
(45) Date of Patent: Mar. 6, 2012

(54) HYSTERETIC INDUCTIVE SWITCHING REGULATOR WITH POWER SUPPLY COMPENSATION

(75) Inventors: Siew Yong Chui, Singapore (SG); Ravishanker Krishnamoorthy, Singapore (SG); Ying Tian Li, Singapore (SG)

(73) Assignee: Marvell International Ltd., Hamilton (BM)

( * ) Notice: Subject to any disclaimer, the term of this patent is extended or adjusted under 35 U.S.C. 154(b) by 458 days.

(21) Appl. No.: 11/595,142

(22) Filed: Nov. 9, 2006

Related U.S. Application Data

(60) Provisional application No. 60/790,103, filed on Apr. 7, 2006.

(51) Int. Cl.
*G05F 1/00* (2006.01)
(52) U.S. Cl. .................. 323/283; 327/176
(58) Field of Classification Search .......... 327/172, 327/175, 176; 323/282, 283, 285
See application file for complete search history.

(56) References Cited

U.S. PATENT DOCUMENTS

| | | | | |
|---|---|---|---|---|
| 5,343,201 A * | 8/1994 | Takayama et al. | ............ | 341/200 |
| 6,940,189 B2 * | 9/2005 | Gizara | ............ | 307/151 |
| 7,049,870 B2 * | 5/2006 | Brown et al. | ............ | 327/172 |
| 7,061,421 B1 * | 6/2006 | Xiao et al. | ............ | 341/155 |
| 7,245,148 B2 * | 7/2007 | Awalt et al. | ............ | 326/38 |
| 2001/0033240 A1 * | 10/2001 | Ueno et al. | ............ | 341/143 |
| 2005/0072949 A1 * | 4/2005 | Near | ............ | 251/129.05 |
| 2005/0122087 A1 * | 6/2005 | Sakai et al. | ............ | 323/271 |
| 2006/0109039 A1 * | 5/2006 | Wu | ............ | 327/172 |

* cited by examiner

*Primary Examiner* — Harry Behm
*Assistant Examiner* — Matthew Grubb

(57) ABSTRACT

A voltage regulator includes a converter module, N comparators, and a decoder module. The converter module includes (N+1) resistors connected in series between a supply voltage and a common voltage, where N is an integer greater than 1. Each of the (N+1) resistors has a value that is different than values of others of the (N+1) resistors. The N comparators have first inputs connected to a reference voltage, and second inputs respectively connected to N nodes between the (N+1) resistors. The decoder module receives outputs of the N comparators and generates an R-bit output, where R is an integer greater than 1. Each bit of the R-bit output indicates a different one of R voltage ranges. A present value of the supply voltage lies in one of the R voltage ranges.

41 Claims, 12 Drawing Sheets

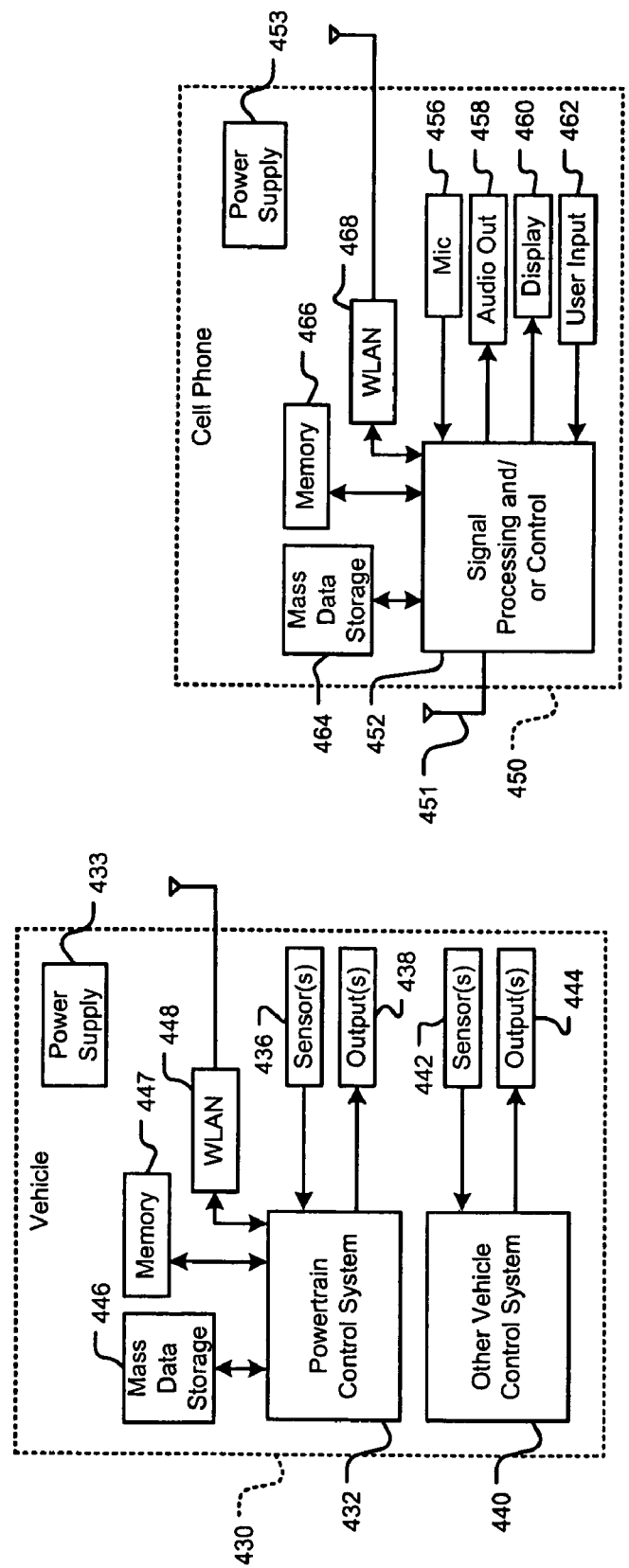

HYSTERETIC INDUCTIVE SWITCHING REGULATOR WITH POWER SUPPLY COMPENSATION

CROSS-REFERENCE TO RELATED APPLICATIONS

This application claims the benefit of U.S. Provisional Application No. 60/790,103, filed on Apr. 7, 2006. The disclosure of the above application is incorporated herein by reference in its entirety.

FIELD

The present disclosure relates to power supply circuits, and more particularly to voltage regulator circuits.

BACKGROUND

The background description provided herein is for the purpose of generally presenting the context of the disclosure. Work of the presently named inventors, to the extent it is described in this background section, as well as aspects of the description which may not otherwise qualify as prior art at the time of filing, are neither expressly nor impliedly admitted as prior art against the present disclosure.

Referring now to FIG. 1A, a power supply 5 supplies power to an electrical or an electronic device, which is generally called a load 20. A voltage regulator circuit (voltage regulator) 8 in the power supply 5 regulates an output voltage of the power supply 5. The voltage regulator 8 maintains the output voltage of the power supply 5 substantially constant although a supply voltage to the power supply 5 may vary within a predetermined range. Additionally, the voltage regulator 8 supplies a load current.

Voltage regulators use various topologies to regulate the output voltage. Referring now to FIG. 1B, a Buck-type voltage regulator (hereinafter a regulator) 10 uses a voltage hysteresis topology. Thus, the regulator 10 may be called a voltage hysteresis regulator. The regulator 10 regulates an output voltage $V_{out}$ supplied to the load 20.

The regulator 10 comprises an error comparator 12, a Buck switch SW 14 (hereinafter switch 14), and a feedback circuit 16 that includes resistors $R_{F1}$ and $R_{F2}$. The feedback circuit 16 feeds back $V_{out}$ to the error comparator 12. The error comparator 12 utilizes a voltage hysteresis and compares $V_{out}$ to a reference voltage $V_{REF}$.

Specifically, $V_{out}$ is regulated by turning the switch 14 on or off when $V_{out}$ varies between first and second threshold voltages. When $V_{out}$ decreases to a value less than the first threshold voltage, an output of the error comparator 12 becomes high, and the switch 14 is turned on. An inductor current flows through an inductor L and charges an output capacitor C causing $V_{out}$ to increase. The switch 14 remains on until $V_{out}$ increases to a value greater than the second threshold voltage.

When $V_{out}$ exceeds the second threshold voltage, the output of the error comparator 12 becomes low, and the switch 14 is turned off. The output capacitor C discharges, and $V_{out}$ decreases. The switch 14 remains off until $V_{out}$ decreases to a value less than the first threshold voltage, and the cycle repeats.

In addition to charging the output capacitor C, the inductor current supplies a load current to the load 20. Thus, the inductor current may be typically higher than the load current. Particularly, a peak value of the inductor current (i.e., a peak inductor current) may be high.

High values of peak inductor current may be disadvantageous. For example, to support high peak inductor currents, inductors with high saturation current ratings may be required. Additionally, high peak inductor currents may cause ripple in the load current. Consequently, current sensing and current limiting circuits may be required to reduce ripple in the load current.

Finally, using voltage hysteresis to regulate $V_{out}$ slows a response time of the regulator 10. Slow response times may cause large overshoots and undershoots in $V_{out}$. Consequently, output capacitors having high capacitance values may be required to reduce the overshoots and undershoots in $V_{out}$.

SUMMARY

A voltage regulator comprises an analog-to-digital converter (ADC) module, a decoder module, and a duty cycle module. The ADC module receives a supply voltage and generates a plurality of binary outputs. The decoder module decodes the binary outputs and generates a control signal. The duty cycle module adjusts a duty cycle of a clock signal based on the control signal, wherein the clock signal is used to regulate an output voltage.

In another feature, the ADC module comprises a voltage divider that divides the supply voltage into a plurality of voltages and a plurality of comparators that compare the voltages to a reference voltage and that generate the binary outputs.

In another feature, the binary outputs represent a present value of the supply voltage.

In another feature, the control signal represents a voltage range that includes a present value of the supply voltage.

In another feature, the duty cycle module adjusts the duty cycle based on a difference between the supply voltage and a present value of the supply voltage.

In another feature, the voltage regulator further comprises a first switch having a control terminal that selectively receives the clock signal, a first terminal that communicates with the supply voltage, and a second terminal. The first switch switches between first and second states at a switching frequency that is substantially equal to a frequency of the clock signal. The first switch is in the first state for a time determined by the duty cycle of the clock signal. The first switch is in the second state and does not switch to the first state when the control terminal of the first switch does not receive the clock signal.

In another feature, the voltage regulator further comprises an inductive element having a first terminal that communicates with the second terminal of the first switch and a second terminal and a capacitive element having a first terminal that communicates with the second terminal of the inductive element and a second terminal that communicates with a common voltage.

In another feature, current flows through the inductive element and charges the capacitive element when the first switch is in the first state.

In another feature, the voltage regulator further comprises a second switch having a first terminal that communicates with the second terminal of the first switch, a control terminal, and a second terminal that communicates with the common voltage, and a diode having a first terminal that communicates with the first terminal of the second switch and a second terminal that communicates with the common voltage.

In another feature, the voltage regulator further comprises a comparator module that compares a switching voltage at the second terminal of the first switch to a threshold voltage, that biases the control terminal of the second switch, and that switches the second switch between the first and second states based on the switching voltage and the threshold voltage.

In another feature, current flows through the inductive element, the diode, and the second switch when the first switch is in the second state.

In another feature, the voltage regulator further comprises a comparator module that compares the output voltage to a target voltage and that generates an output having one of the first and second states.

In another feature, the voltage regulator further comprises a flip-flop module that communicates with the comparator module, that is clocked by the clock signal, and that generates an output that is latched to one of the first and second states.

In another feature, the voltage regulator further comprises a driver module that communicates with the flip-flop module, that receives the clock signal, that transmits the clock signal to the control terminal of the first switch when the output of the flip-flop module is in the first state, and that does not transmit the clock signal to the control terminal of the first switch when the output of the flip-flop module is in the second state.

In still other features, a voltage regulator comprises a control module that generates a control signal based on a supply voltage and a duty cycle module that generates a clock signal having a variable duty cycle based on the control signal, wherein the clock signal is used to maintain an output voltage V substantially equal to V, where V is a real number. The variable duty cycle is inversely proportional to the supply voltage.

In still other features, a method comprises receiving a supply voltage, generating a plurality of binary outputs based on the supply voltage, decoding the binary outputs and generating a control signal, adjusting a duty cycle of a clock signal based on the control signal, and regulating an output voltage based on the clock signal.

In another feature, the method further comprises dividing the supply voltage into a plurality of voltages, and comparing the voltages to a reference voltage and generating the binary outputs.

In another feature, the method further comprises representing a present value of the supply voltage with the binary outputs.

In another feature, the method further comprises representing a voltage range that includes a present value of the supply voltage the control signal with the control signal.

In another feature, the method further comprises adjusting the duty cycle based on a difference between the supply voltage and a present value of the supply voltage.

In another feature, the method further comprises arranging a first switch having first and second terminals and a control terminal, selectively communicating between the control terminal and the clock signal, and communicating between the first terminal and the supply voltage. The method further comprises switching a state of the first switch between first and second states at a switching frequency that is substantially equal to a frequency of the clock signal. The method further comprises switching the state of the first switch to the first state for a time determined by the duty cycle of the clock signal. The method further comprises and switching the state of the first switch to the second state and not to the first state when the control terminal of the first switch does not communicate with the clock signal.

In another feature, the method further comprises arranging an inductive element having first and second terminals, communicates between the first terminal of the inductive element and the second terminal of the first switch, arranging a capacitive element having first and second terminals, communicating between the first terminal of the capacitive element and the second terminal of the inductive element, and communicating between the second terminal of the capacitive element and a common voltage.

In another feature, the method further comprises passing current through the inductive element and charging the capacitive element when the first switch is in the first state.

In another feature, the method further comprises arranging a second switch having first and second terminals and a first terminal, communicating between the first terminal of the second switch and the second terminal of the first switch, and communicating between the second terminal of the second switch and the common voltage. The method further comprises arranging a diode having first and second terminals, communicating between the first terminal of the diode and the first terminal of the second switch, and communicating between the second terminal of the diode and common voltage.

In another feature, the method further comprises comparing a switching voltage at the second terminal of the first switch to a threshold voltage, biasing the control terminal of the second switch, and switching the second switch between the first and second states based on the switching voltage and the threshold voltage.

In another feature, the method further comprises passing current through the inductive element, the diode, and the second switch when the first switch is in the second state.

In another feature, the method further comprises comparing the output voltage to a target voltage and generating an output having one of the first and second states.

In another feature, the method further comprises clocking a flip-flop using the clock signal and latching an output of the flip-flop to one of the first and second states.

In another feature, the method further comprises transmitting the clock signal to the control terminal of the first switch when the output of the flip-flop module is in the first state, and not transmitting the clock signal to the control terminal of the first switch when the output of the flip-flop module is in the second state.

In still other features, a method comprises generating a control signal based on a supply voltage, generating a clock signal having a variable duty cycle based on the control signal, and maintaining an output voltage V substantially equal to V based on the clock signal, where V is a real number. The method further comprises adjusting the variable duty cycle in inverse proportion to the supply voltage.

In still other features, a voltage regulator comprises analog-to-digital converter (ADC) means for receiving a supply voltage and generating a plurality of binary outputs, decoder means for decoding the binary outputs and generating a control signal, and duty cycle means for adjusting a duty cycle of a clock signal based on the control signal, wherein the clock signal is used to regulate an output voltage.

In another feature, the ADC means comprises voltage divider means for dividing the supply voltage into a plurality of voltages, and comparator means for comparing the voltages to a reference voltage and generating the binary outputs.

In another feature, the binary outputs represent a present value of the supply voltage.

In another feature, the control signal represents a voltage range that includes a present value of the supply voltage.

In another feature, the duty cycle means adjusts the duty cycle based on a difference between the supply voltage and a present value of the supply voltage.

In another feature, the voltage regulator further comprises first switching means for switching states, having a control terminal that selectively receives the clock signal, a first terminal that communicates with the supply voltage, and a second terminal. The first switching means switches between first and second states at a switching frequency that is substantially equal to a frequency of the clock signal. The first switching means is in the first state for a time determined by the duty cycle of the clock signal. The first switching means is in the second state and does not switch to the first state when the control terminal of the first switching means does not receive the clock signal.

In another feature, the voltage regulator further comprises inductive means for providing inductance, having a first terminal that communicates with the second terminal of the first switching means and a second terminal, and capacitive means for providing capacitance, having a first terminal that communicates with the second terminal of the inductive means and a second terminal that communicates with a common voltage.

In another feature, current flows through the inductive means and charges the capacitive means when the first switching means is in the first state.

In another feature, the voltage regulator further comprises second switching means for switching states, having a first terminal that communicates with the second terminal of the first switching means, a control terminal, and a second terminal that communicates with the common voltage, and a diode having a first terminal that communicates with the first terminal of the second switching means and a second terminal that communicates with the common voltage.

In another feature, the voltage regulator further comprises comparator means for comparing a switching voltage at the second terminal of the first switching means to a threshold voltage, biasing the control terminal of the second switching means, and switching a state of the second switching means between the first and second states based on the switching voltage and the threshold voltage.

In another feature, current flows through the inductive means, the diode, and the second switching means when the first switching means is in the second state.

In another feature, the voltage regulator further comprises comparator means for comparing the output voltage to a target voltage and generating an output having one of the first and second states.

In another feature, the voltage regulator further comprises flip-flop means for generating an output, that communicates with the comparator means, that is clocked by the clock signal, and that generates the output that is latched to one of the first and second states.

In another feature, the voltage regulator further comprises driver means for driving the first switching means, that communicates with the flip-flop means, that receives the clock signal, that transmits the clock signal to the control terminal of the first switching means when the output of the flip-flop means is in the first state, and that does not transmit the clock signal to the control terminal of the first switching means when the output of the flip-flop means is in the second state.

In still other features, a voltage regulator comprises control means for generating a control signal based on a supply voltage, and duty cycle means for generating a clock signal having a variable duty cycle based on the control signal, wherein the clock signal is used to maintain an output voltage V substantially equal to V, where V is a real number. The variable duty cycle is inversely proportional to the supply voltage.

Further areas of applicability of the present disclosure will become apparent from the detailed description provided hereinafter. It should be understood that the detailed description and specific examples, while indicating the preferred embodiment of the disclosure, are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIG. 4D is a functional block diagram of a vehicle control system;

FIG. 4E is a functional block diagram of a cellular phone;

DETAILED DESCRIPTION

Figure 1A:
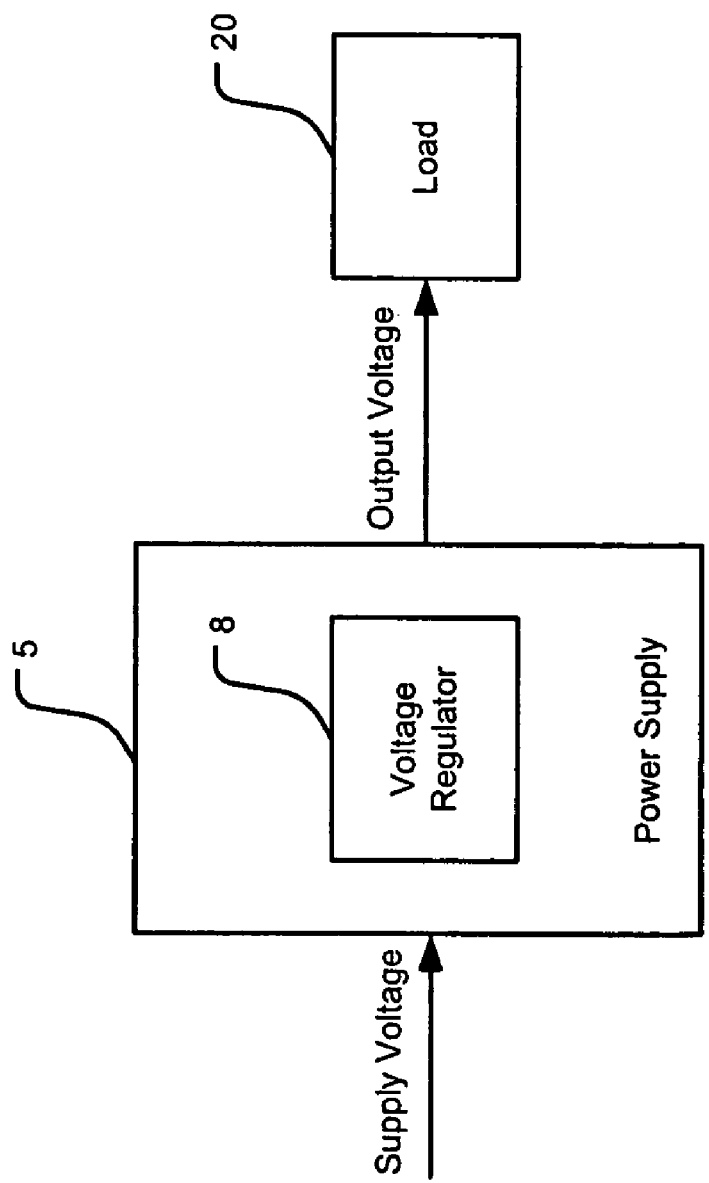
FIG. 1A is a functional block diagram of a power supply that supplies power to a load.
Figure 1B:
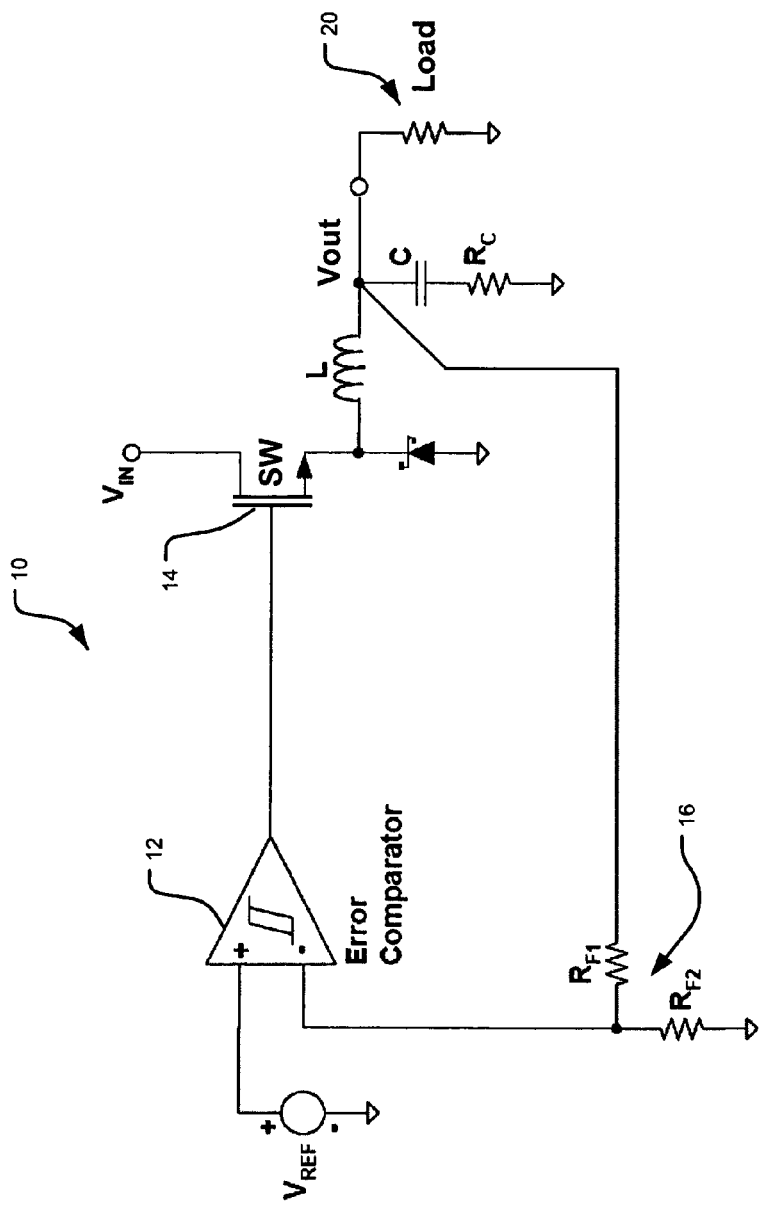
FIG. 1B is a circuit diagram of an exemplary voltage regulator according to the prior art.

The following description is merely exemplary in nature and is in no way intended to limit the disclosure, its application, or uses. For purposes of clarity, the same reference numbers will be used in the drawings to identify similar elements. As used herein, the term module, circuit and/or device refers to an Application Specific Integrated Circuit (ASIC), an electronic circuit, a processor (shared, dedicated, or group) and memory that execute one or more software or firmware programs, a combinational logic circuit, and/or other suitable components that provide the described functionality. As used herein, the phrase at least one of A, B, and C should be construed to mean a logical (A or B or C), using a non-exclusive logical or. It should be understood that steps within a method may be executed in different order without altering the principles of the present disclosure.

Figure 2A:
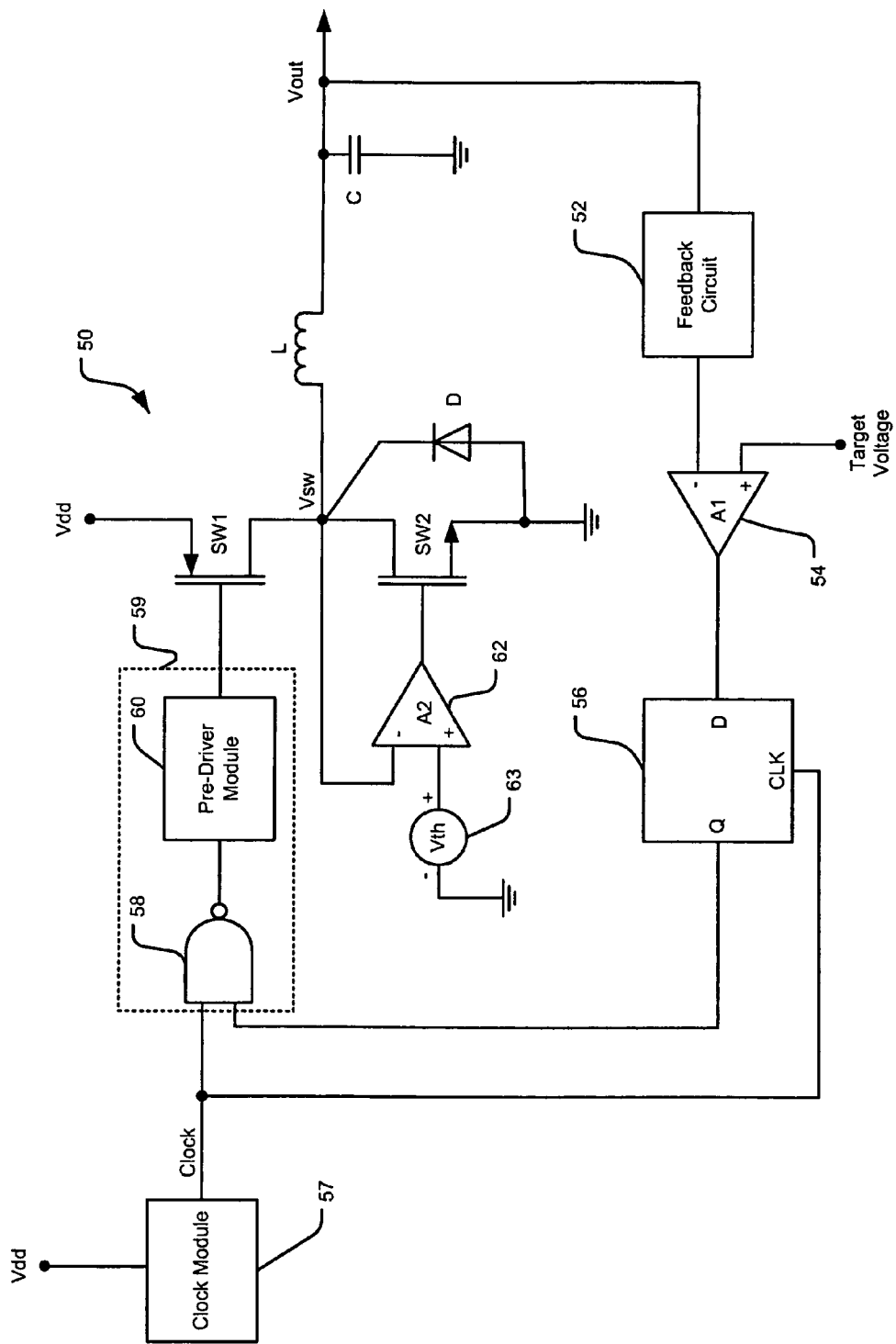
FIG. 2A is a functional block diagram of an exemplary voltage regulator according to the present disclosure.

Referring now to FIG. 2A, a voltage hysteresis switching regulator 50 comprises a feedback circuit 52, a feedback voltage comparator (A1) 54, a D flip-flop 56, a clock module 57, a driver module 59, switches SW1 and SW2, and a switching voltage comparator (A2) 62. The driver module 59 comprises a NAND gate 58 and a pre-driver module 60. Additionally, the voltage hysteresis switching regulator 50 (hereinafter regulator 50) comprises an inductor L, an output capacitor C, and a diode D as shown.

The regulator 50 regulates an output voltage $V_{out}$ that is supplied to a load (not shown). Particularly, the regulator 50 supplies a substantially constant $V_{out}$ when a supply voltage $V_{dd}$ varies within a predetermined range. Additionally, the regulator 50 minimizes a peak value of an inductor current while supplying a load current.

Specifically, the feedback circuit 52 feeds back $V_{out}$ to the feedback voltage comparator (A1) 54. The feedback voltage comparator (A1) 54 compares $V_{out}$ to a target voltage $V_t$. The target voltage is a desired value of $V_{out}$. When $V_{out}$ decreases and $V_{out} < V_t$, an output of the feedback voltage comparator (A1) 54 changes to a high state (i.e., to a binary 1). The output of the feedback voltage comparator (A1) 54 is fed to a D input of the D flip-flop 56. The D flip-flop 56 is clocked by a clock signal generated by the clock module 57. The D flip-flop 56 latches the D input to a Q output of the D flip-flip 56 on a next rising edge of the clock signal. Thus, the Q output is latched to the high state (i.e. to the binary 1).

The Q output of the D flip-flop 56 is fed to a first input of the NAND gate 58. The clock signal that clocks the D flip-flop 56 is fed to a second input of the NAND gate 58. When the Q output is high (i.e., a binary 1), the clock signal passes through the NAND gate 58 to the pre-driver module 60.

The pre-driver module 60 turns the switch SW1 on or off based on a state (high or low) and a duty cycle of the clock signal. That is, the switch SW1 is turned on when the clock signal is in a high state (i.e., a binary 1), and the switch SW1 is turned off when the clock signal is in a low state (i.e., a binary 0). Additionally, the switch SW1 is turned on for a period that is based on the duty cycle of the clock signal.

When the switch SW1 is turned on, an inductor current $I_{ind}$ flows through the inductor L. $I_{ind}$ charges the output capacitor C and supplies a load current to the load. When the switch SW1 is turned off, $I_{ind}$ discharges through the diode D and the switch SW2. The switching voltage comparator (A2) 62 turns the switch SW2 on when voltage $V_{sw}$ is negative. $V_{sw}$ is negative when $I_{ind}$ is non-zero. The switching voltage comparator (A2) 62 turns the switch SW2 off before $V_{sw}$ becomes positive.

A voltage trip point of the switching voltage comparator (A2) 62 is a threshold voltage at which the output of the switching voltage comparator (A2) 62 switches to turn the switch SW2 on or off. The voltage trip point of the switching voltage comparator (A2) 62 may be adjusted by inputting a voltage source $V_{th}$ 63 to the switching voltage comparator (A2) 62 as shown.

$V_{out}$ increases due to the charging and discharging of $I_{ind}$. When $V_{out} > V_t$, the output of the feedback voltage comparator (A1) 54 changes to a low state (i.e., a binary 0). The output of the feedback voltage comparator (A1) 54 is fed to the D input of the D flip-flop 56. The D flip-flop 56 latches the D input to the Q output of the D flip-flip 56 on the next rising edge of the clock signal. Thus, the Q output is latched to the low state (i.e., the binary 0).

The Q output of the D flip-flop 56 is fed to the first input of the NAND gate 58. When one input of the NAND gate 58 is in the low state (i.e., the binary 0), an output of the NAND gate 58 is in a high state (i.e., a binary 1) regardless of a state of a second input of the NAND gate 58. Since the first input of the NAND gate 58 is in the low state (i.e., the binary 0), the clock signal that is fed to the second input of the NAND gate 58 does not pass through the NAND gate 58 to the pre-driver module 60. Consequently, the pre-driver module 60 does not turn the switch SW1 on or off based on the state of the clock signal. Instead, since the output of the NAND gate 58 is in the high state (i.e., the binary 1), the pre-driver module 60 turns the switch SW1 off, and $V_{out}$ decreases.

The duty cycle of the clock signal is a ratio of a period during which the clock signal is high to a period of one cycle of the clock signal. The duty cycle of the clock signal determines a duration for which the switch SW1 remains on. Thus, $V_{out}$ may be regulated by controlling the duty cycle of the clock signal.

For example, if the supply voltage $V_{dd}$ is 3.3V, the duty cycle to generate $V_{out}$=1.2V is 36.4% (i.e., a ratio (1.2V/3.3V)). $V_{out}$ will be less than 1.2V if the duty cycle of the clock signal is less than 36.4%, and $V_{out}$ will be greater than 1.2V if the duty cycle of the clock signal is greater than 36.4%.

The duty cycle of the clock signal may be inversely proportional to the supply voltage $V_{dd}$. For example, when $V_{dd}$ decreases to a value less than 3.3V, $V_{out}$ can be maintained substantially constant at 1.2V by increasing the duty cycle of the clock signal from 36.4% to 62.5%. On the other hand, when the $V_{dd}$ is between 3.3V and 4.3V, $V_{out}$ can be maintained substantially constant at 1.2V by increasing the duty cycle of the clock signal from 36.4% to 50%. Finally, when $V_{dd}$ increases to a value greater than 4.3V, $V_{out}$ can be maintained substantially constant at 1.2V by keeping the duty cycle of the clock signal at 37.5%.

Figure 2B:
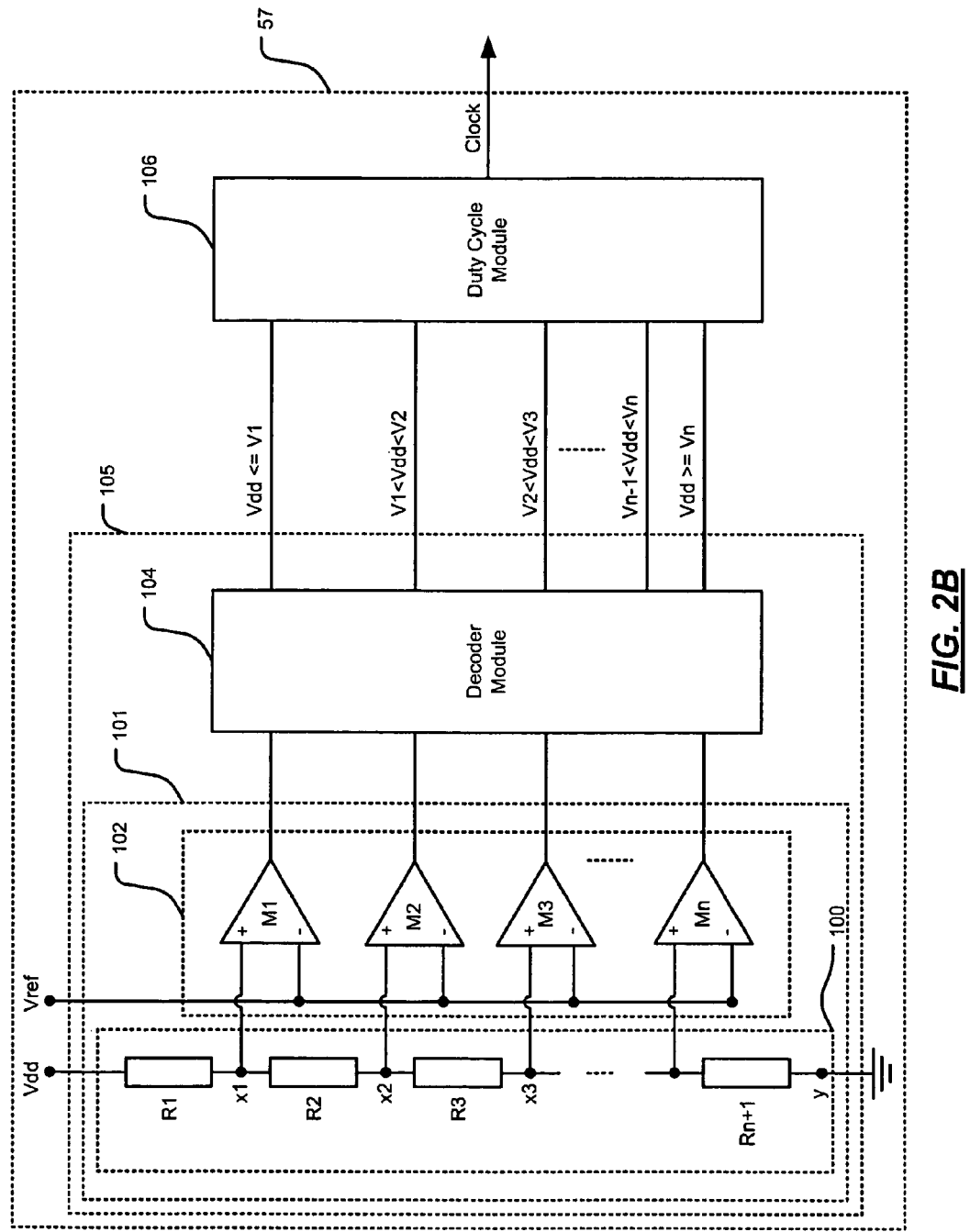
FIG. 2B is a functional block diagram of a clock module that generates a clock signal with variable duty cycle that is used to regulate an output voltage of the voltage regulator of FIG. 2A.

Thus, when the supply voltage $V_{dd}$ varies within a range, $V_{out}$ can be maintained substantially constant at a desired or a target voltage by generating a clock signal having a variable duty cycle, where the variable duty cycle varies inversely with the supply voltage. Referring now to FIG. 2B, the clock module 57 generates the clock signal with the variable duty cycle. The clock signal with the variable duty cycle enables the regulator 50 to maintain $V_{out}$ substantially constant. Additionally, the variable duty cycle decreases a peak value of the inductor current $I_{ind}$ (i.e., peak $I_{ind}$), which reduces ripple in $V_{out}$.

The clock module 57 comprises a control module 105 and a duty cycle module 106. The control module 105 comprises an analog-to-digital converter (ADC) module 101, and a decoder module 104. The ADC module 101 comprises a voltage divider module 100 and a comparator module 102.

The voltage divider module 100 comprises a plurality of resistances R1, R2, ..., $R_{n+1}$ that are connected in series as shown. The voltage divider module 100 divides the supply voltage $V_{dd}$ into a plurality of voltages. The comparator module 102 comprises n comparators M1, M2, M3, ..., Mn. Each one of the n comparators compares a predetermined reference voltage $V_{ref}$ to one of the voltages generated by the voltage divider module 100.

Each one of the n comparators generates a high output (i.e., a binary 1) or a low output (i.e., a binary 0) based on whether the voltages generated by the voltage divider module 100 are greater or less than $V_{ref}$. For example, comparator M1 compares $V_{ref}$ to a voltage between points x1 and y. The comparator M1 generates a high output if the voltage between points x1 and y is greater than $V_{ref}$ and a low output if the voltage between points x1 and y is less than $V_{ref}$. Similarly, comparator M2 compares $V_{ref}$ to a voltage between points x2 and y, etc.

Thus, for a present value of $V_{dd}$, the comparator module 102 generates a set of binary data comprising n-bits. In other words, the comparator module 102 generates a binary word having a width of n-bits that represents the present value of $V_{dd}$. Each one of the n bits in the binary word is generated by one of the n comparators in the comparator module 102. Thus, the binary word comprises a set of high and low values (i.e., 1s and 0s) generated by the comparators. One or more of the n bits in the binary word may change presently when $V_{dd}$ varies with time.

The decoder module 104 decodes the binary word generated by the comparator module 102 and generates a control signal that indicates a voltage range in which the present value of $V_{dd}$ lies. For example, $V_{dd}$ may be less than or equal to a voltage V1 at a given time. In that case, the decoder module 104 generates a control signal that indicates $V_{dd} \leq V1$. At another time, $V_{dd}$ may be greater than the voltage V1 but less than a voltage V2. In that case, the decoder module 104 generates a control signal that indicates $V1 < V_{dd} < V2$, etc.

The control signal of the decoder module 104 is fed to the duty cycle module 106. The duty cycle module 106 generates the clock signal that is input to the D flip-flop 56 and the NAND gate 58. The duty cycle module 106 adjusts the duty cycle of the clock signal based on the control signal. The regulator 50 regulates $V_{out}$ according to the duty cycle.

An accuracy with which the duty cycle may be adjusted may be proportional to a number of comparators used in the comparator module 102. Consequently, the accuracy with which $V_{out}$ can be regulated may be proportional to the number of comparators used in the comparator module 102.

Figure 2C:
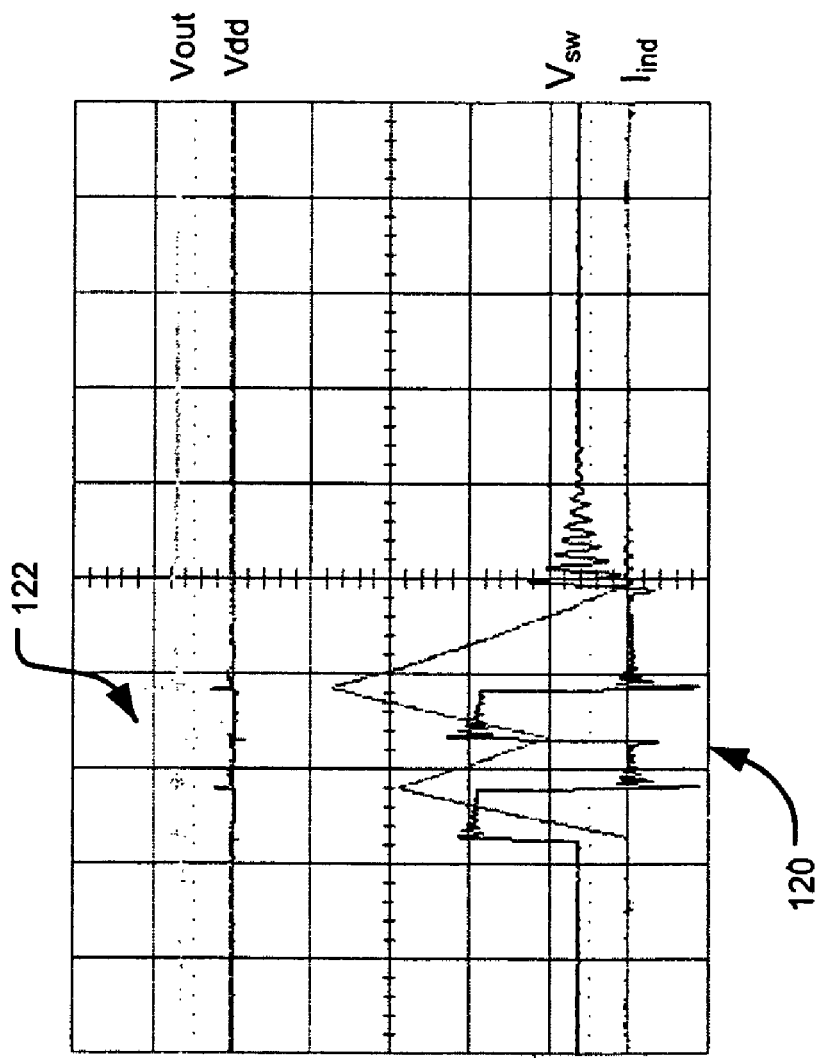
FIG. 2C is a graph of an output voltage, a supply voltage, a switching voltage, and an inductor current of the voltage regulator of FIG. 2A relative to time when load current is small.

Referring now to FIG. 2C, for small load currents (e.g., 10 mA when $V_{dd}$=4V), the duty cycle of the clock signal, which determines switching frequency of the switch SW1 of the regulator 50, need not be variable. Instead, the duty cycle may be fixed as shown at 120. That is, for small load currents, even if the duty cycle of the clock signal is fixed, the peak inductor current may not increase significantly and therefore may not cause a significant ripple in the output voltage as shown at 122.

Figure 2D:
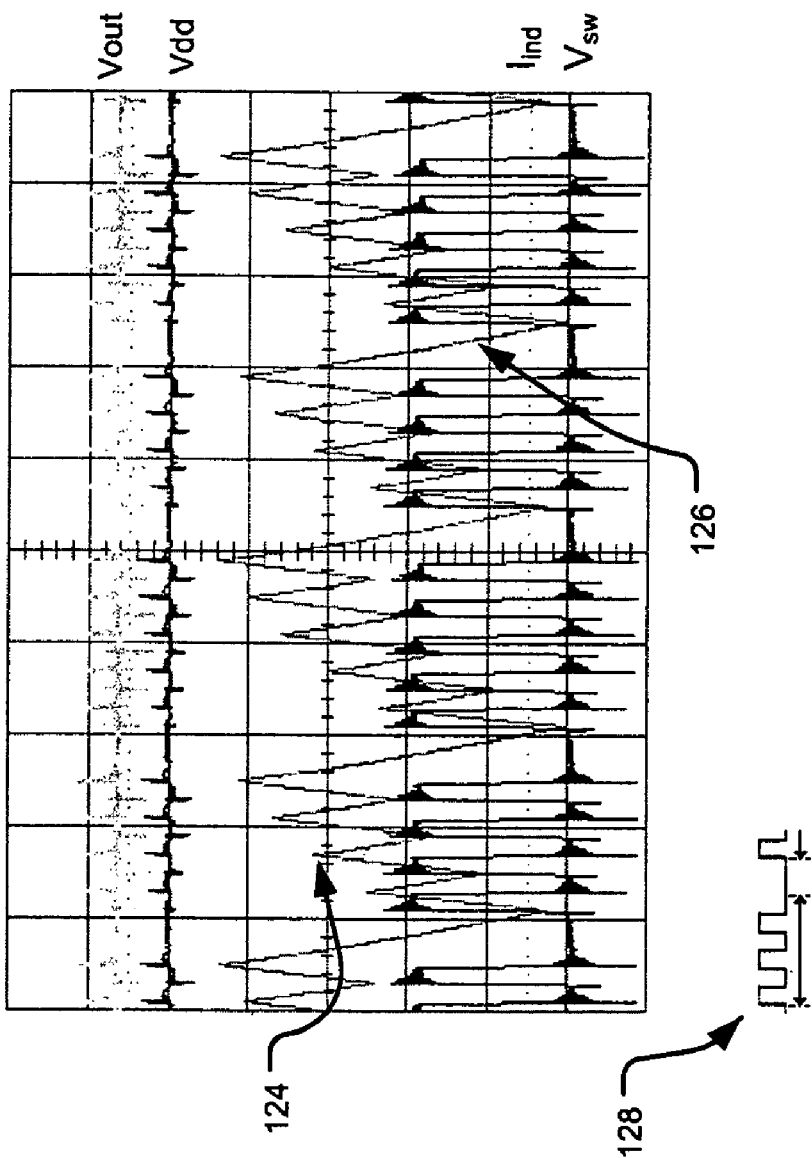
FIG. 2D is a graph of an output voltage, a supply voltage, a switching voltage, and an inductor current of the voltage regulator of FIG. 2A relative to time when load current is large.

Referring now to FIG. 2D, for large load currents (e.g., 230 mA when $V_{dd}$=4V), the peak inductor current can be minimized although the regulator 50 operates in a quasi-continuous state. The quasi-continuous state includes a continuous state as shown at 124 and operation in a discontinuous state as shown at 126. The regulator 50 operates in the continuous state when the Q output of the D flip-flop 56 is 1, and the pre-driver module 60 turns the switch SW1 on or off according to the duty cycle of the clock signal. The regulator 50 operates in the discontinuous state when the Q output of the D flip-flop 56 is 0, and the pre-driver module 60 turns the switch SW1 off. The clock signal is shown at 128.

Thus, regulating $V_{out}$ using the clock signal having the variable duty cycle offers many advantages. Specifically, since the duty cycle is adjusted in response to variations in $V_{dd}$, $V_{out}$ can be regulated despite variations in $V_{dd}$ without using current sensing and/or current limiting circuits. Additionally, peak $I_{ind}$ is minimized. By minimizing $I_{ind}$, the ripple in $V_{out}$ is minimized. Minimizing $I_{ind}$ also allows using an inductor having a low saturation current as the inductor L. Finally, since the response time of the regulator 50 is improved, a capacitor having a low capacitance value can be used as the output capacitor C.

Although the regulator 50 shown as an example is a voltage hysteresis switching regulator, the clock signal having the variable duty cycle generated by the clock module 57 can be used with any switching regulator. Although the NAND gate 58 is shown as an example, other logic gates and/or combinations thereof may be used to achieve the same result. Similarly, although the D flip-flop 56 is shown as an example, other flip-flops in combination with logic gates and other circuits may be used to achieve the same result. Additionally, the D flip-flop 56, the feedback voltage comparator A1 52, the switching voltage comparator (A2) 62, and switches SW1 and SW2 can be implemented by one or more modules.

Finally, the diode D may be Schottkey diode, and switches SW1 and SW2 may be transistors or other switching devices.

Figure 3A:
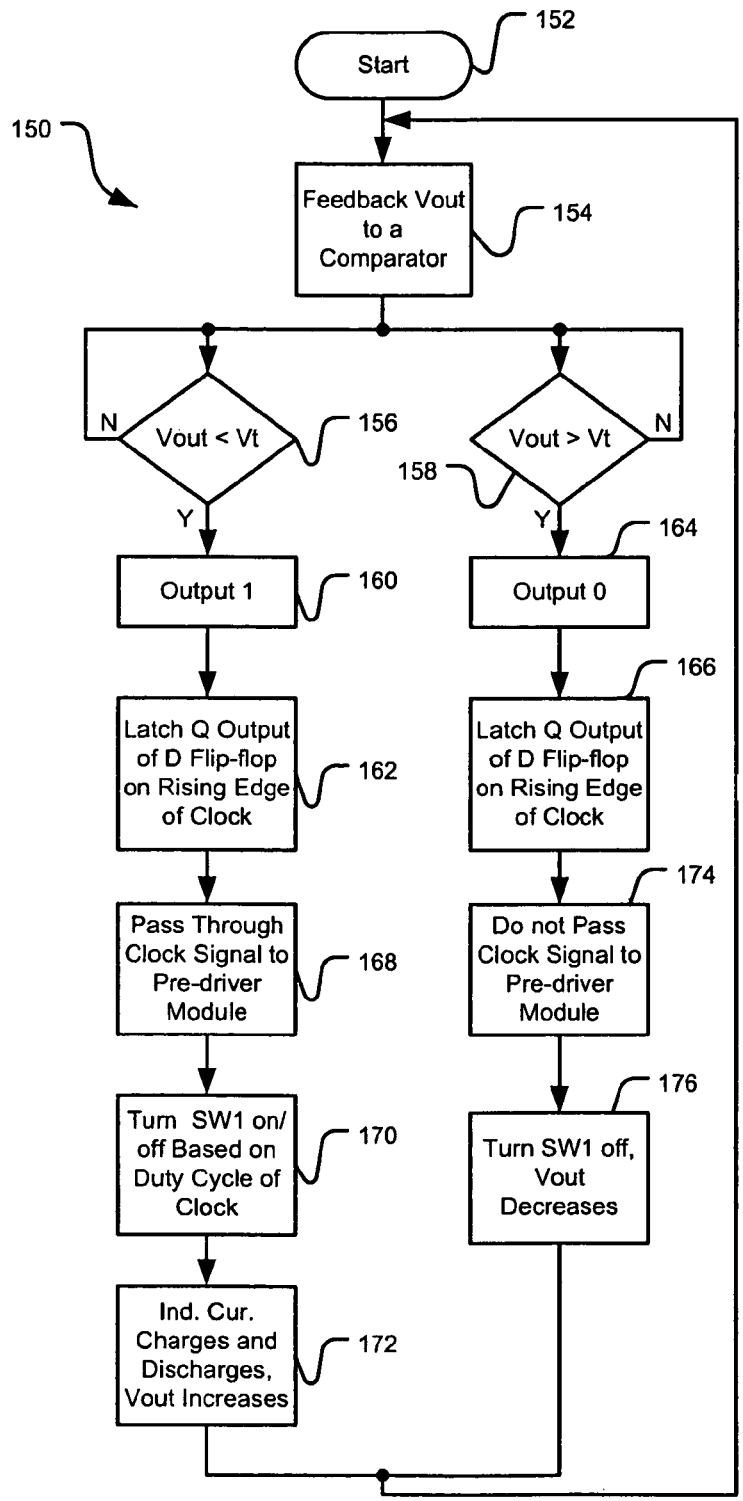
FIG. 3A is a flowchart of an exemplary method for regulating an output voltage of the voltage regulator of FIG. 2A.

Referring now to FIG. 3A, a method 150 for regulating an output voltage $V_{out}$ of a power supply begins at step 152. A feedback circuit 52 feeds back $V_{out}$ to a voltage comparator (A1) 54 in step 154. The voltage comparator (A1) 54 compares $V_{out}$ to a desired or a target voltage $V_t$ of the output voltage in steps 156 and 158.

Specifically, the voltage comparator (A1) 54 determines whether $V_{out} < V_t$ in step 156 and whether $V_{out} > V_t$ in step 158. If $V_{out} < V_t$, the voltage comparator (A1)) 54 outputs a binary 1 in step 160. A D flip-flop 56 latches an output Q to the binary 1 in step 162 on a next rising edge of a clock signal generated by a clock module 57. If, however, $V_{out} > V_t$, the voltage comparator (A1) 54 outputs a binary 0 in step 164. The D flip-flop 56 latches the output Q to the binary 0 in step 166 on the next rising edge of a clock signal generated by a clock module 57.

If Q=1, a NAND gate 58 passes through the clock signal to a pre-driver module 60 in step 168. The clock signal turns a switch SW1 on or off based on a duty cycle of the clock signal in step 170. Specifically, an inductor current $I_{ind}$ charges an output capacitor C when the clock signal turns the switch SW1 on and discharges through a diode D and a switch SW2 when the clock signal turns the SW1 off in step 172. The charging and discharging of $I_{ind}$ increases $V_{out}$, and the method 150 starts again at step 152.

If, however, Q=0, the NAND gate 58 does not pass through the clock signal to the pre-driver module 60 in step 174. The pre-driver module 60 turns the switch SW1 off in step 176, $V_{out}$ decreases, and the method 150 starts again at step 154.

Figure 3B:
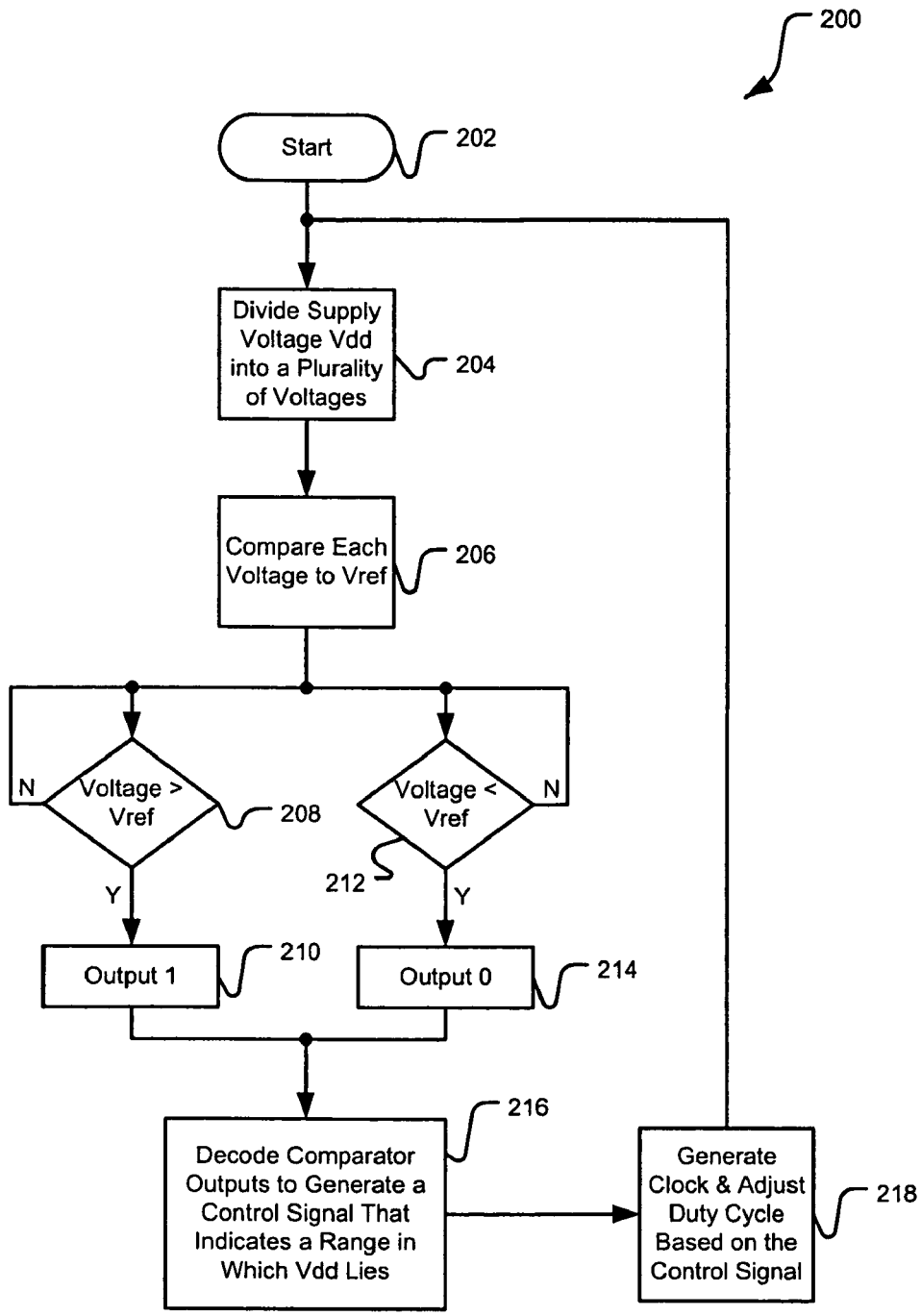
FIG. 3B is a flowchart of an exemplary method for generating a clock signal with variable duty cycle that is used to regulate an output voltage of the voltage regulator of FIG. 2A.

Referring now to FIG. 3B, a method 200 for generating a clock signal to regulate $V_{out}$, where a duty cycle of the clock signal varies based on a supply voltage $V_{dd}$, begins at step 202. A voltage divider module 100 divides the supply voltage $V_{dd}$ into a plurality of voltages in step 204. A comparator module 102 comprising a plurality of comparators compares the voltages to a predetermined reference voltage $V_{ref}$ in step 206.

When any one of the comparators in the comparator module 102 determines that one of the voltages is greater than $V_{ref}$ in step 208, that comparator outputs a binary 1 in step 210. When, however, any one of the comparators in the comparator module 102 determines that one of the voltages is less than $V_{ref}$ in step 212, that comparator outputs a binary 0 in step 214.

A decoder module 104 decodes a binary word comprising the binary 1s and 0s generated in steps 212 and 214 and generates a control signal that indicates a range in which the supply voltage lies at a given time in step 216. A duty cycle module 106 generates a clock signal in step 218, and adjusts a duty cycle of the clock signal based on the control signal. Steps 202 through 218 are repeated.

Figure 4A:
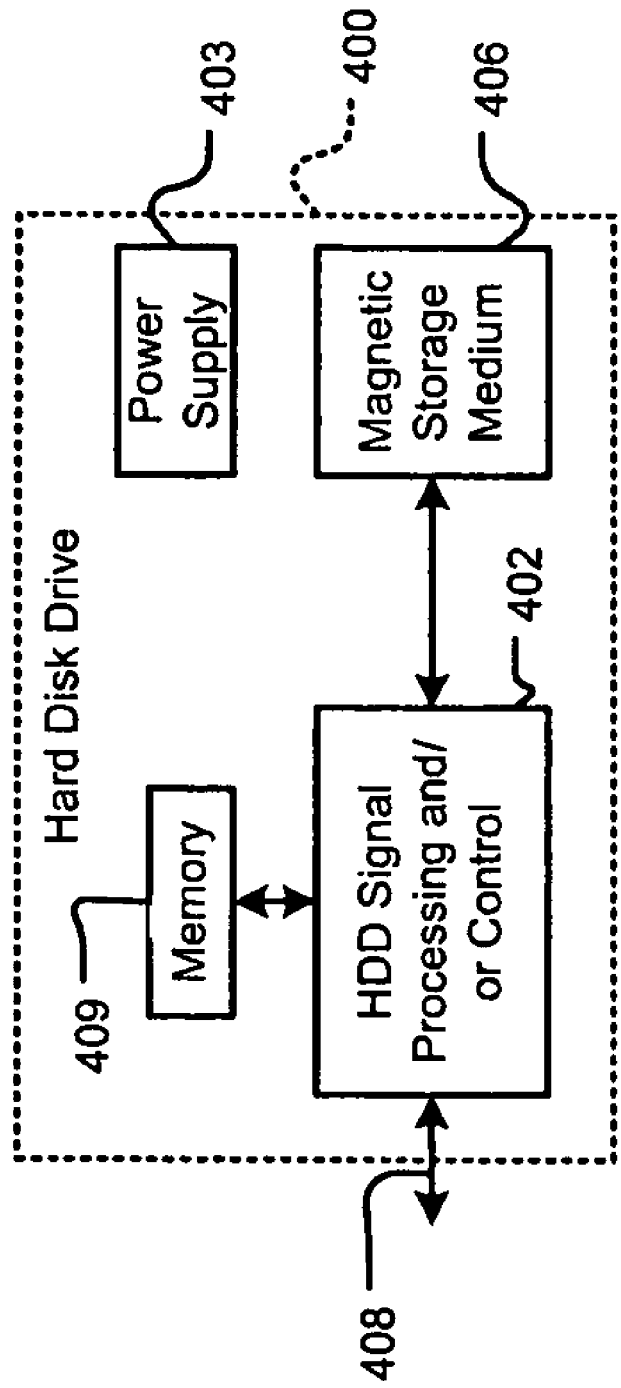
FIG. 4A is a functional block diagram of a hard disk drive.

Referring now to FIGS. 4A-4G, various exemplary implementations of the regulator 50 are shown. Referring now to FIG. 4A, the regulator 50 can be implemented in a power supply 403 of a hard disk drive 400. In some implementations, a signal processing and/or control circuit 402 and/or other circuits (not shown) in the HDD 400 may process data, perform coding and/or encryption, perform calculations, and/or or format data that is output to and/or received from a magnetic storage medium 406.

The HDD 400 may communicate with a host device (not shown) such as a computer, mobile computing devices such as personal digital assistants, cellular phones, media or MP3 players and the like, and/or other devices via one or more wired or wireless communication links 408. The HDD 400 may be connected to memory 409 such as random access memory (RAM), low latency nonvolatile memory such as flash memory, read only memory (ROM), and/or other suitable electronic data storage.

Figure 4C:
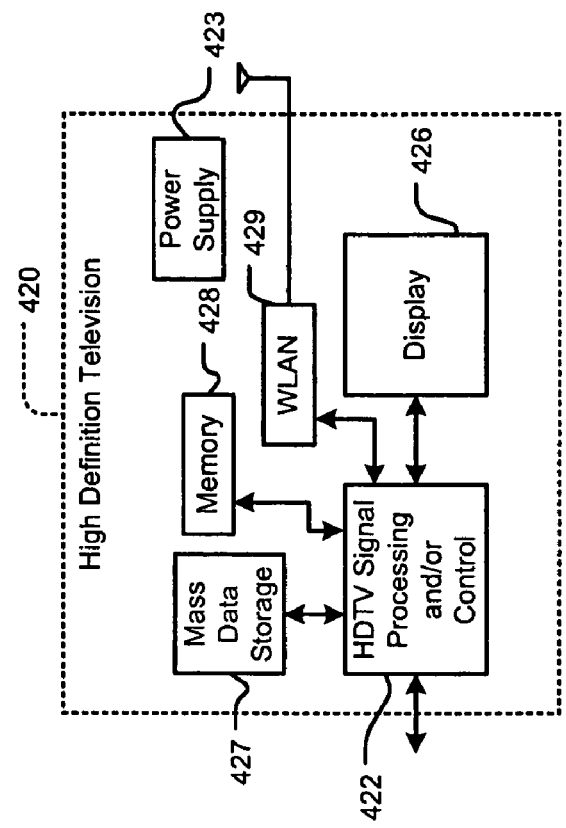
FIG. 4C is a functional block diagram of a high definition television.
Figure 4B:
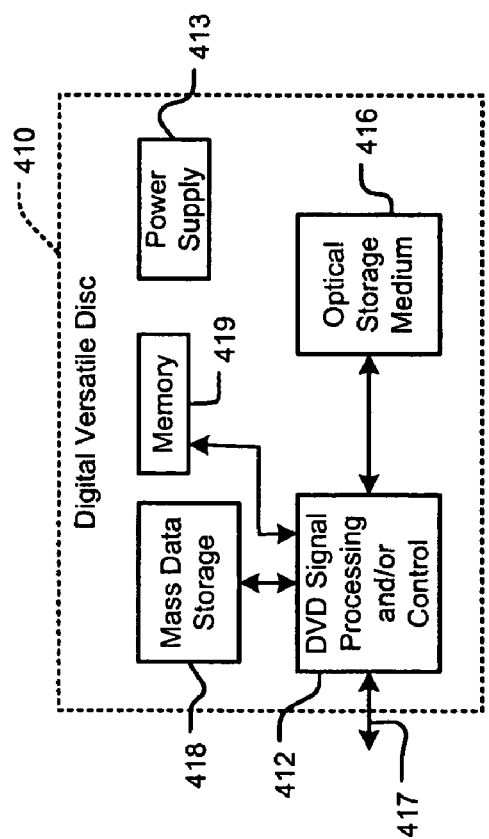
FIG. 4B is a functional block diagram of a digital versatile disk (DVD)

Referring now to FIG. 4B, the regulator 50 can be implemented in a power supply 413 of a digital versatile disc (DVD) drive 410. In some implementations, a signal processing and/or control circuit 412 and/or other circuits (not shown) in the DVD drive 410 may process data, perform coding and/or encryption, perform calculations, and/or format data that is read from and/or data written to an optical storage medium 416. The signal processing and/or control circuit 412 and/or other circuits (not shown) in the DVD drive 410 may also perform other functions such as encoding and/or decoding and/or any other signal processing functions associated with the DVD drive 410.

The DVD drive 410 may communicate with an output device (not shown) such as a computer, a television or other device via one or more wired or wireless communication links 417. The DVD drive 410 may communicate with mass data storage 418 that stores data in a nonvolatile manner. The mass data storage 418 may include a hard disk drive (HDD). The HDD may have the configuration shown in FIG. 4A. The HDD may be a mini HDD that includes one or more platters having a diameter that is smaller than approximately 1.8". The DVD drive 410 may be connected to memory 419 such as RAM, ROM, low latency nonvolatile memory such as flash memory, and/or other suitable electronic data storage.

Referring now to FIG. 4C, the regulator 50 can be implemented in a power supply 423 of a high definition television (HDTV) 420. The HDTV 420 receives HDTV input signals in either a wired or wireless format and generates HDTV output signals for a display 426. In some implementations, signal processing circuit and/or control circuit 422 and/or other circuits (not shown) of the HDTV 420 may process data, perform coding and/or encryption, perform calculations, format data and/or perform any other type of processing that the HDTV 420 may require.

The HDTV 420 may communicate with a mass data storage 427 that stores data in a nonvolatile manner such as optical and/or magnetic storage devices including hard disk drives (HDDs) and digital versatile disk (DVD) drives. At least one HDD may have the configuration shown in FIG. 4A and/or at least one DVD drive may have the configuration shown in FIG. 4B. The HDD may be a mini HDD that includes one or more platters having a diameter that is smaller than approximately 1.8". The HDTV 420 may be connected to memory 428 such as RAM, ROM, low latency nonvolatile memory such as flash memory and/or other suitable electronic data storage. The HDTV 420 also may support connections with a WLAN via a WLAN interface 429.

Referring now to FIG. 4D, the regulator 50 may be implemented in a power supply 433 of a control system of a vehicle 430. In some implementations, a powertrain control system 432 receives inputs from one or more sensors such as temperature sensors, pressure sensors, rotational sensors, airflow sensors and/or any other suitable sensors and/or generates one or more output control signals such as engine operating parameters, transmission operating parameters, and/or other control signals.

A control system 440 may likewise receive signals from input sensors 442 and/or output control signals to one or more output devices 444. In some implementations, the control system 440 may be part of an anti-lock braking system (ABS), a navigation system, a telematics system, a vehicle telematics system, a lane departure system, an adaptive cruise control system, a vehicle entertainment system such as a stereo, DVD, compact disc and the like. Still other implementations are contemplated.

The powertrain control system 432 may communicate with a mass data storage 446 that stores data in a nonvolatile manner. The mass data storage 446 may include optical and/or magnetic storage devices such as hard disk drives (HDDs) and/or DVD drives. At least one HDD may have the configuration shown in FIG. 4A and/or at least one DVD drive may have the configuration shown in FIG. 4B. The HDD may be a mini HDD that includes one or more platters having a diameter that is smaller than approximately 1.8".

The powertrain control system 432 may be connected to memory 447 such as RAM, ROM, low latency nonvolatile memory such as flash memory and/or other suitable electronic data storage. The powertrain control system 432 also may support connections with a WLAN via a WLAN interface 448. The control system 440 may also include mass data storage, memory and/or a WLAN interface (all not shown).

Referring now to FIG. 4E, the regulator 50 can be implemented in a power supply 453 of a cellular phone 450 that may include a cellular antenna 451. In some implementations, the cellular phone 450 includes a microphone 456, an audio output 458 such as a speaker and/or audio output jack, a display 460 and/or an input device 462 such as a keypad, pointing device, voice actuation and/or other input device. Signal processing and/or control circuits 452 and/or other circuits (not shown) in the cellular phone 450 may process data, perform coding and/or encryption, perform calculations, format data and/or perform other cellular phone functions.

The cellular phone 450 may communicate with a mass data storage 464 that stores data in a nonvolatile manner such as optical and/or magnetic storage devices including hard disk drives (HDDs) and/or digital versatile disk (DVD) drives. At least one HDD may have the configuration shown in FIG. 4A and/or at least one DVD drive may have the configuration shown in FIG. 4B. The HDD may be a mini HDD that includes one or more platters having a diameter that is smaller than approximately 1.8". The cellular phone 450 may be connected to memory 466 such as RAM, ROM, low latency nonvolatile memory such as flash memory and/or other suitable electronic data storage. The cellular phone 450 also may support connections with a WLAN via a WLAN interface 468.

Figure 4F:
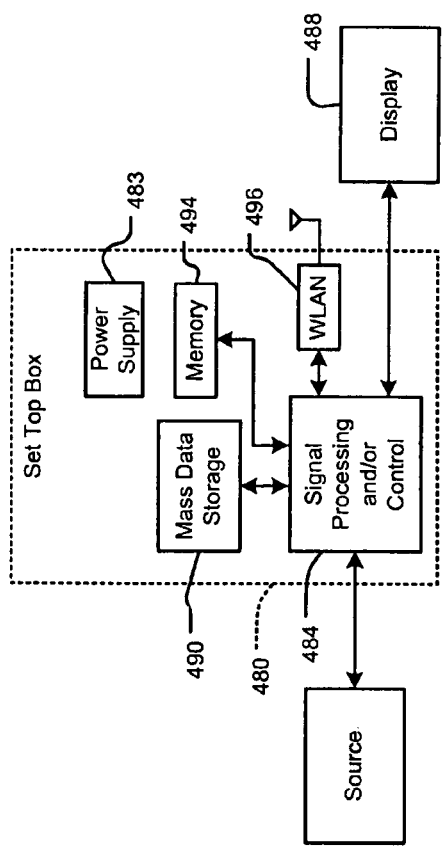
FIG. 4F is a functional block diagram of a set top box.

Referring now to FIG. 4F, the regulator 50 can be implemented in a power supply 483 of a set top box 480. The set top box 480 receives signals from a source such as a broadband source and outputs standard and/or high definition audio/video signals suitable for a display 488 such as a television and/or a monitor and/or other video and/or audio output devices. Signal processing and/or control circuits 484 and/or other circuits (not shown) of the set top box 480 may process data, perform coding and/or encryption, perform calculations, format data and/or perform any other set top box function.

The set top box 480 may communicate with a mass data storage 490 that stores data in a nonvolatile manner. The mass data storage 490 may include optical and/or magnetic storage devices such as hard disk drives (HDDs) and/or DVD drives. At least one HDD may have the configuration shown in FIG. 4A and/or at least one DVD drive may have the configuration shown in FIG. 4B. The HDD may be a mini HDD that includes one or more platters having a diameter that is smaller than approximately 1.8". The set top box 480 may be connected to memory 494 such as RAM, ROM, low latency nonvolatile memory such as flash memory and/or other suitable electronic data storage. The set top box 480 also may support connections with a WLAN via a WLAN interface 496.

Figure 4G:
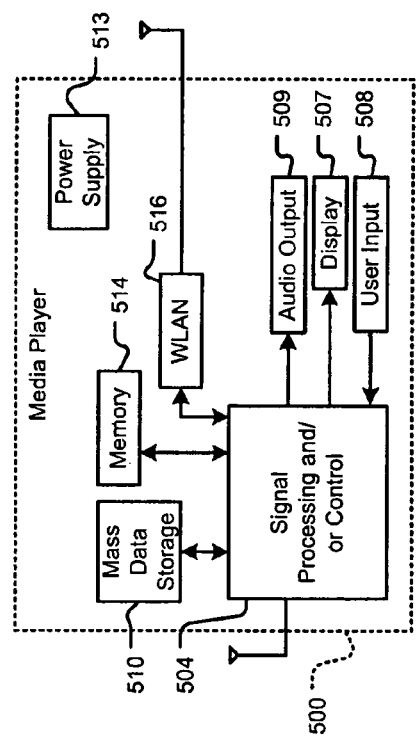
FIG. 4G is a functional block diagram of a media player.

Referring now to FIG. 4G, the regulator 50 can be implemented in a power supply 503 of a media player 500. In some implementations, the media player 500 includes a display 507 and/or a user input 508 such as a keypad, a touchpad, and the like. In some implementations, the media player 500 may employ a graphical user interface (GUI) that typically employs menus, drop down menus, icons and/or a point-and-click interface via the display 507 and/or user input 508. The media player 500 further includes an audio output 509 such as a speaker and/or audio output jack. The signal processing and/or control circuits 504 and/or other circuits (not shown) of the media player 500 may process data, perform coding and/or encryption, perform calculations, format data and/or perform any other media player function.

The media player 500 may communicate with a mass data storage 510 that stores data such as compressed audio and/or video content in a nonvolatile manner. In some implementations, the compressed audio files include files that are compliant with MP3 format or other suitable compressed audio and/or video formats. The mass data storage may include optical and/or magnetic storage devices such as hard disk drives (HDDs) and/or DVD drives. At least one HDD may have the configuration shown in FIG. 4A and/or at least one DVD drive may have the configuration shown in FIG. 4B. The HDD may be a mini HDD that includes one or more platters having a diameter that is smaller than approximately 1.8".

The media player 500 may be connected to memory 514 such as RAM, ROM, low latency nonvolatile memory such as flash memory and/or other suitable electronic data storage. The media player 500 also may support connections with a WLAN via a WLAN interface 516. Still other implementations in addition to those described above are contemplated.

Those skilled in the art can now appreciate from the foregoing description that the broad teachings of the present disclosure can be implemented in a variety of forms. Therefore, while the present disclosure includes particular examples, the true scope of the present disclosure should not be so limited since other modifications will become apparent to the skilled practitioner upon a study of the drawings, the specification and the following claims.

What is claimed is:

1. A voltage regulator, comprising:
   a converter module including
      (N+1) resistors connected in series between a supply voltage and a common voltage, where N is an integer greater than 1, and
      N comparators having first inputs and second inputs,
         wherein the first inputs of the N comparators are connected to a reference voltage, and
         wherein the second inputs of the N comparators are respectively connected to N nodes between the (N+1) resistors;
   a decoder module configured to receive outputs of the N comparators and to generate an R-bit output,
      wherein each bit of the R-bit output indicates a different one of R voltage ranges,
      wherein a present value of the supply voltage lies in one of the R voltage ranges,
      wherein each of the R voltage ranges is different than others of R voltage ranges, and
      wherein values of the R voltage ranges depend on values of the (N+1) resistors, where R is an integer greater than 1;
   a duty cycle module configured to adjust a duty cycle of a clock signal based on the one of the R voltage ranges indicated by the R-bit output, wherein the clock signal is used to control a first switch to regulate an output voltage; and
   a driver module configured to
      receive the clock signal,
         selectively allow the clock signal to pass through to the first switch based on a comparison of the output voltage to a target voltage, and
         drive the first switch at the duty cycle of the clock signal when the clock signal is allowed to pass through to the first switch.

2. The voltage regulator of claim 1, wherein the duty cycle module adjusts the duty cycle based on a difference between i) a predetermined value of the supply voltage and ii) the present value of the supply voltage.

3. The voltage regulator of claim 1, further comprising:
   the first switch having
      a control terminal that the driver module selectively drives at the duty cycle of the clock signal,
      a first terminal that communicates with the supply voltage, and
      a second terminal,
   wherein the first switch switches between first and second states at a switching frequency that is substantially equal to a frequency of the clock signal;
   wherein the first switch is in the first state for a time determined by the duty cycle of the clock signal; and
   wherein the first switch is in the second state and does not switch to the first state when the driver module does not drive the control terminal.

4. The voltage regulator of claim 3, further comprising:
   an inductive element having
      a first terminal that communicates with the second terminal of the first switch, and
      a second terminal; and
   a capacitive element having
      a first terminal that communicates with the second terminal of the inductive element, and
      a second terminal that communicates with the common voltage.

5. The voltage regulator of claim 4, wherein current flows through the inductive element and charges the capacitive element when the first switch is in the first state.

6. The voltage regulator of claim 4, further comprising:
   a second switch having
      a first terminal that communicates with the second terminal of the first switch,
      a control terminal, and
      a second terminal that communicates with the common voltage; and
   a diode having
      a first terminal that communicates with the first terminal of the second switch, and
      a second terminal that communicates with the common voltage.

7. The voltage regulator of claim 6, further comprising a comparator module configured to
   compare a switching voltage at the second terminal of the first switch to a threshold voltage,
   bias the control terminal of the second switch, and
   switch the second switch between the first and second states based on the switching voltage and the threshold voltage.

8. The voltage regulator of claim 7, wherein current flows through the inductive element, the diode, and the second switch when the first switch is in the second state.

9. The voltage regulator of claim 3, further comprising a comparator module that compares the output voltage to the target voltage and that generates an output having one of the first and second states.

10. The voltage regulator of claim 9, further comprising a flip-flop module configured to
   communicate with the comparator module, and
   generate an output that is latched to one of the first and second states when clocked by the clock signal.

11. The voltage regulator of claim 10, wherein the driver module drives the control terminal of the first switch at the duty cycle of the clock signal when the output of the flip-flop module is in one of the first and second states.

12. The voltage regulator of claim 1, wherein only one of the R bits has a first state, and wherein others of the R bits have a second state.

13. A voltage regulator, comprising:
   a control module configured to generate an R-bit output based on a supply voltage,
      wherein each bit of the R-bit output indicates a different one of R voltage ranges,
      wherein a present value of the supply voltage lies in one of the R voltage ranges,
      wherein each of the R voltage ranges is different than others of the R voltage ranges,
      wherein values of the R voltage ranges depend on values of (N+1) resistors connected in series between the supply voltage and a common voltage, and
      where R is an integer greater than 1, and N is an integer greater than 1;
   a duty cycle module that generates a clock signal having a variable duty cycle based on the one of the R voltage ranges indicated by the R-bit output, wherein the clock signal is used to control a first switch to regulate an output voltage at a substantially constant value; and
   a driver module that
      receives the clock signal,
      selectively allows the clock signal to pass through to the first switch based on a comparison of the output voltage to a target voltage, and
      drives the first switch at the duty cycle of the clock signal when the clock signal is allowed to pass through to the first switch.

14. The voltage regulator of claim 13, wherein the variable duty cycle is inversely proportional to the supply voltage.

15. A method comprising:
   receiving a supply voltage;
   dividing the supply voltage into a plurality of voltages using (N+1) resistors connected in series between the supply voltage and a common voltage,
   and where N is an integer greater than 1;
   comparing the voltages to a reference voltage and generating binary outputs;
   decoding the binary outputs and generating an R-bit output,
      wherein each bit of the R-bit output indicates a different one of R voltage ranges,
      wherein a present value of the supply voltage lies in one of the R voltage ranges,
      wherein each of the R voltage ranges is different than others of the R voltage ranges, and
      wherein values of the R voltage ranges depend on values of the (N+1) resistors, where R is an integer greater than 1;
   adjusting a duty cycle of a clock signal based on the R-bit output;
   regulating an output voltage by controlling a first switch based on the clock signal;
   receiving the clock signal;
   selectively allowing the clock signal to pass through to the first switch based on a comparison of the output voltage to a target voltage; and
   driving the first switch at the duty cycle of the clock signal when the clock signal is allowed to pass through to the first switch.

16. The method of claim 15, further comprising representing the present value of the supply voltage with the binary outputs.

17. The method of claim 15, further comprising adjusting the duty cycle based on a difference between i) a predetermined value of the supply voltage and ii) the present value of the supply voltage.

18. The method of claim 15, further comprising:
   arranging the first switch having first and second terminals and a control terminal;
   selectively communicating between the control terminal and the clock signal;
   communicating between the first terminal and the supply voltage;
   switching a state of the first switch between first and second states at a switching frequency that is substantially equal to a frequency of the clock signal;
   switching the state of the first switch to the first state for a time determined by the duty cycle of the clock signal; and
   switching the state of the first switch to the second state and not to the first state when the control terminal of the first switch does not communicate with the clock signal.

19. The method of claim 18, further comprising:
   arranging an inductive element having first and second terminals;
   communicating between the first terminal of the inductive element and the second terminal of the first switch;
   arranging a capacitive element having first and second terminals;
   communicating between the first terminal of the capacitive element and the second terminal of the inductive element; and
   communicating between the second terminal of the capacitive element and a common voltage.

20. The method of claim 19, further comprising passing current through the inductive element and charging the capacitive element when the first switch is in the first state.

21. The method of claim 19, further comprising:
   arranging a second switch having first and second terminals and a first terminal;
   communicating between the first terminal of the second switch and the second terminal of the first switch;
   communicating between the second terminal of the second switch and the common voltage;
   arranging a diode having first and second terminals;
   communicating between the first terminal of the diode and the first terminal of the second switch; and
   communicating between the second terminal of the diode and the common voltage.

22. The method of claim 21, further comprising:
   comparing a switching voltage at the second terminal of the first switch to a threshold voltage;
   biasing the control terminal of the second switch; and switching the second switch between the first and second states based on the switching voltage and the threshold voltage.

23. The method of claim 22, further comprising passing current through the inductive element, the diode, and the second switch when the first switch is in the second state.

24. The method of claim 18, further comprising comparing the output voltage to the target voltage and generating an output having one of the first and second states.

25. The method of claim 24, further comprising:
clocking a flip-flop using the clock signal; and
latching an output of the flip-flop to one of the first and second states.

26. The method of claim 25, further comprising driving the control terminal of the first switch at the duty cycle of the clock signal when the output of the flip-flop is in one of the first and second states.

27. A method comprising:
generating an R-bit output based on a supply voltage,
wherein each bit of the R-bit output indicates a different one of R voltage ranges,
wherein a present value of the supply voltage lies in one of the R voltage ranges,
wherein each of the R voltage ranges is different than others of the R voltage ranges,
wherein values of the R voltage ranges depend on values of (N+1) resistors connected in series between the supply voltage and a common voltage, and
where R is an integer greater than 1, and N is an integer greater than 1;
generating a clock signal having a variable duty cycle based on the one of the R voltage ranges indicated by the R-bit output;
regulating an output voltage at a substantially constant value by controlling a first switch based on the clock signal;
receiving the clock signal;
selectively allowing the clock signal to pass through to the first switch based on a comparison of the output voltage to a target voltage; and
driving the first switch at the duty cycle of the clock signal when the clock signal is allowed to pass through to the first switch.

28. The method of claim 27, further comprising adjusting the variable duty cycle in inverse proportion to the supply voltage.

29. A voltage regulator, comprising:
converter means for converting a supply voltage, the converter means comprising
(N+1) resistors connected in series between a supply voltage and a common voltage,
where N is an integer greater than 1; and
N comparing means for comparing a reference voltage, the N comparing means having
first inputs connected to the reference voltage, and
second inputs respectively connected to N nodes between the (N+1) resistors;
decoder means for decoding outputs of the N comparing means and generating an R-bit output,
wherein each bit of the R-bit output indicates a different one of R voltage ranges,
wherein a present value of the supply voltage lies in one of the R voltage ranges,
wherein each of the R voltage ranges is different than others of the R voltage ranges, and
wherein values of the R voltage ranges depend on values of the (N+1) resistors, where R is an integer greater than 1;
duty cycle means for adjusting a duty cycle of a clock signal based on the one of the R voltage ranges indicated by the R-bit output, wherein the clock signal is used to control first switching means for switching states to regulate an output voltage; and
driving means for
receiving the clock signal,
selectively allowing the clock signal to pass through to the first switching means based on a comparison of the output voltage to a target voltage, and
driving the first switching means at the duty cycle of the clock signal when the clock signal is allowed to pass through to the first switching means.

30. The voltage regulator of claim 29, wherein the duty cycle means adjusts the duty cycle based on a difference between i) a predetermined value of the supply voltage and ii) the present value of the supply voltage.

31. The voltage regulator of claim 29, further comprising:
the first switching means having
a control terminal that the driver means selectively drives at the duty cycle of the clock signal,
a first terminal that communicates with the supply voltage, and
a second terminal,
wherein the first switching means switches between first and second states at a switching frequency that is substantially equal to a frequency of the clock signal;
wherein the first switching means is in the first state for a time determined by the duty cycle of the clock signal; and
wherein the first switching means is in the second state and does not switch to the first state when the driver means does not drive the control terminal.

32. The voltage regulator of claim 31, further comprising:
inductive means for providing inductance, the inductive means having
a first terminal that communicates with the second terminal of the first switching means, and
a second terminal; and
capacitive means for providing capacitance, the capacitive means having
a first terminal that communicates with the second terminal of the inductive means, and
a second terminal that communicates with the common voltage.

33. The voltage regulator of claim 32, wherein current flows through the inductive means and charges the capacitive means when the first switching means is in the first state.

34. The voltage regulator of claim 32, further comprising:
second switching means having
a first terminal that communicates with the second terminal of the first switching means,
a control terminal, and
a second terminal that communicates with the common voltage; and
a diode having
a first terminal that communicates with the first terminal of the second switching means, and
a second terminal that communicates with the common voltage.

35. The voltage regulator of claim 34, further comprising comparator means for comparing a switching voltage at the second terminal of the first switching means to a threshold voltage, biasing the control terminal of the second switching means, and switching a state of the second switching means between the first and second states based on the switching voltage and the threshold voltage.

36. The voltage regulator of claim 35, wherein current flows through the inductive means, the diode, and the second switching means when the first switching means is in the second state.

37. The voltage regulator of claim 31, further comprising comparator means for comparing the output voltage to the target voltage and generating an output having one of the first and second states.

38. The voltage regulator of claim 37, further comprising flip-flop means for generating an output, wherein the flip-flop means
communicates with the comparator means,
is clocked by the clock signal, and
generates the output that is latched to one of the first and second states.

39. The voltage regulator of claim 38, wherein the driver means drives the control terminal of the first switching means at the duty cycle of the clock signal when the output of the flip-flop means is in one of the first and second states.

40. A voltage regulator, comprising:
control means for generating an R-bit output based on a supply voltage,
wherein each bit of the R-bit output indicates a different one of R voltage ranges,
wherein a present value of the supply voltage lies in one of the R voltage ranges,
wherein each of the R voltage ranges is different than others of the R voltage ranges,
wherein values of the R voltage ranges depend on values of (N+1) resistors connected in series between the supply voltage and a common voltage, and
where R is an integer greater than 1, and N is an integer greater than 1;
duty cycle means for generating a clock signal having a variable duty cycle based on the one of the R voltage ranges indicated by the R-bit output, wherein the clock signal is used to control first switching means for switching states to regulate an output voltage at a substantially constant value; and
driving means for
receiving the clock signal,
selectively allowing the clock signal to pass through to the first switching means based on a comparison of the output voltage to a target voltage, and
driving the first switching means at the duty cycle of the clock signal when the clock signal is allowed to pass through to the first switching means.

41. The voltage regulator of claim 40, wherein the variable duty cycle is inversely proportional to the supply voltage.

* * * * *